United States Patent [19]

Benedict

[11] 4,224,142
[45] Sep. 23, 1980

[54] TREATMENT OF RECYCLED AMMONIUM SULFATE-BISULFATE SOLUTION

[75] Inventor: Bruce C. Benedict, Bartlesville, Okla.

[73] Assignee: Phillips Petroleum Company, Bartlesville, Okla.

[21] Appl. No.: 53,445

[22] Filed: Jun. 29, 1979

[51] Int. Cl.$^2$ .................. C01C 1/242; C10M 11/00
[52] U.S. Cl. ............................ 208/179; 208/251 R; 208/289; 423/517; 423/545; 423/549
[58] Field of Search ............... 208/179, 251 R, 289; 423/517, 545, 549

[56] References Cited

U.S. PATENT DOCUMENTS

| | | | |
|---|---|---|---|
| 3,169,917 | 2/1965 | Kahan | 208/180 |
| 3,294,678 | 12/1966 | Gleim | 208/309 |
| 3,791,965 | 2/1974 | Fitzsimons et al. | 208/179 |
| 3,879,282 | 4/1975 | Johnson | 208/184 |
| 3,930,988 | 1/1976 | Johnson | 208/182 |

*Primary Examiner*—Herbert Levine

[57] ABSTRACT

Ammonium sulfate-bisulfate solution contaminated with metal and other ash producing contaminants is treated by adjusting the pH of the solution to the range that produces a precipitate of the contaminant by the addition of ammonia or ammonium hydroxide; cooled to at least the temperature at which a precipitate is produced; removing the precipitate from the solution; the pH of the solution from which the precipitate has been removed is adjusted to the range at which precipitation is substantially completed by the addition of sulfuric acid; and the $SO_4^=$ ion concentration and the $NH_4^+$ ion concentration of the solution are adjusted to the range of the solution before initial circulation to produce a solution in which the metal concentration has been sufficiently reduced to permit recycle for use in reclaiming used motor oils.

10 Claims, 1 Drawing Figure

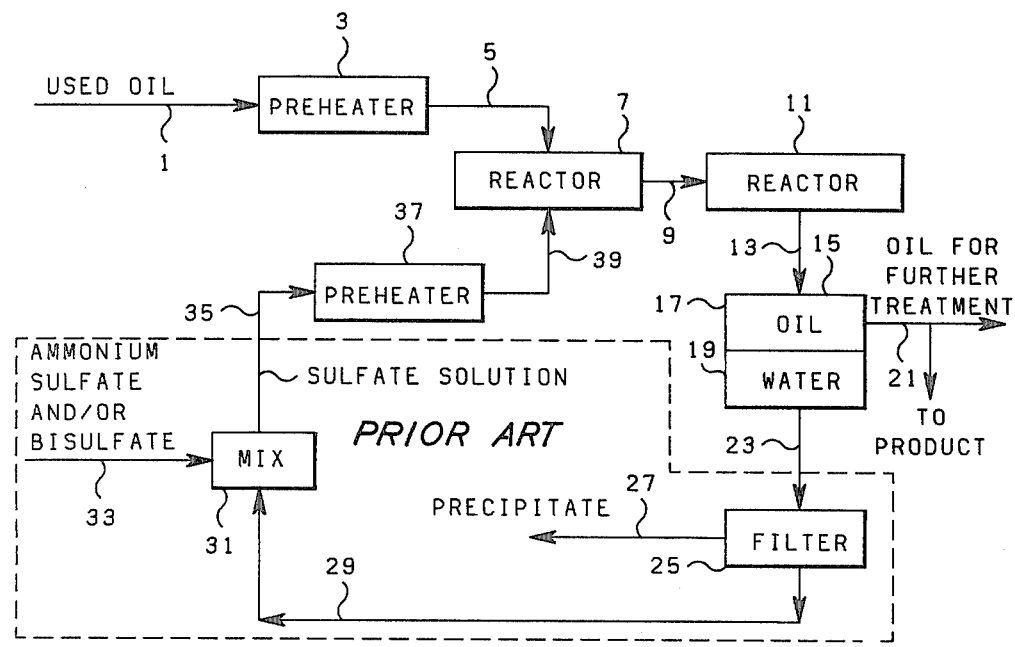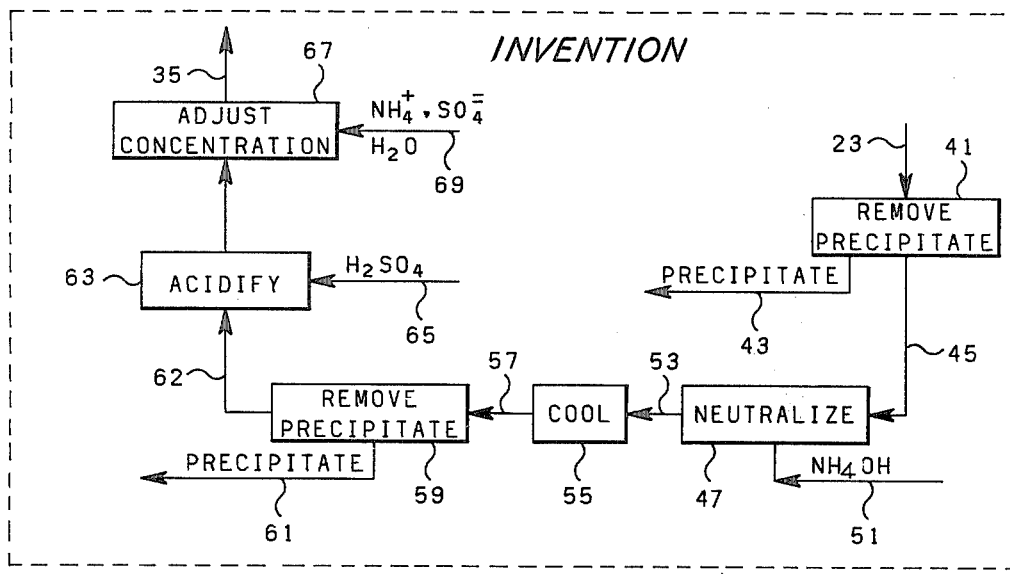

TREATMENT OF RECYCLED AMMONIUM SULFATE-BISULFATE SOLUTION

BACKGROUND OF THE INVENTION

This invention relates broadly to the treatment of motor oils. In accordance with one aspect of the invention it relates to ammonium sulfate-bisulfate solutions used in the treatment of used motor oils. In another of its aspects, it relates to the treatment of ammonium sulfate-bisulfate solutions for the removal of metal and other contaminants which form ash. In yet another of its aspects, it relates to the recycling of ammonium sulfate-bisulfate solution in the reclaiming of used motor oils.

There is an ever increasing concern for the conservation of our petroleum reserves and the best use of products derived from them. The reclaiming of used motor oil has, therefore, become very important. Among the best processes for recovering used motor oil is the treatment set out in U.S. Pat. No. 3,930,988 using an aqueous solution of ammonium sulfate and/or ammonium bisulfate which produces a purified oil that can be used as a burning oil substantially free of the harmful lead and other additives of modern lubricating oils, that can be reprocessed by means of conventional hydrotreating processes to yield a high grade lubricating oil-base stock that can be recompounded to give high grade lubricating oil, or that can be used as a heating oil or road oil. The process is also designed to recirculate the process material and the processing material in such a way that compounds potentially hazardous to the environment are removed with no ecological problem being produced.

It has been discovered in this process, however, that in the recycling of the aqueous solution of ammonium sulfate and/or ammonium bisulfate used in the process that the recycled solution can become saturated with a solid material that is based on contamination of the solution with metal and other ash forming contaminants, for example contamination with zinc in which the contaminant has been described as having the probable formula $(NH_4)_2Zn(SO_4)_2.6H_2O$. The recycle solution can become so heavily saturated with contaminant that the material can be deposited on the walls of reaction vessels and in the piping. Since deposition of the solid material is detrimental to the process, it is imperative that the zinc contaminant be minimized in the recycled solution.

It is therefore an object of this invention to provide a method for minimizing metal contaminant in a solution of ammonium sulfate and/or ammonium bisulfate. It is another object of this invention to provide an improved method for regenerating ammonium sulfate/ammonium bisulfate solution recycled in the treatment of used motor oil. It is still another object of this invention to provide an improved method for reclaiming used motor oil.

Other aspects, objects and the various advantages of this invention will become apparent upon reading this specification, studying the drawings, and the claims of this application.

STATEMENT OF THE INVENTION

According to this invention a method is provided for regenerating ammonium sulfate-bisulfate solution which contains metal and other contaminants which form ash. In the process the pH of the ammonium sulfate-bisulfate solution is adjusted to a range that will produce a precipitate of the metal contaminant by the addition of ammonia or ammonium hydroxide; the solution is then cooled to a temperature at which the precipitation is substantially complete; after removal of the precipitate the pH of the solution and the concentrations of the $SO_4^=$ ion and the $NH_4^+$ ion are adjusted to the range of the treating solution originally circulated. The process removes sufficient metal contaminant to prevent disruption of the operation of a process for reclaiming used motor oil for which the ammonium sulfate-bisulfate solution can be used as treatment liquid.

In one of its embodiments, this invention provides a method by which ammonium sulfate-bisulfate solution which has been regenerated is cycled into contact with used lubricating oil under conditions of temperature and pressure sufficient to react the treating solution with metal-containing components present in the used lubricating oil to form metal-containing solids. The reaction mass is then allowed to separate into an oil phase and an aqueous phase containing the solids, the oil phase is recovered as a marketable low-ash oil product, and the aqueous phase is treated for removal of the produced solids and to provide an ammonium sulfate-bisulfate solution that can be recycled for further treatment of used oil.

In other embodiments of the invention solids are removed from the ammonium sulfate-bisulfate solution either by treatment before the initial adjustment of pH by the process of this invention or by removal of these solids along with the precipitate produced by cooling the pH adjusted solution.

Although the process of this invention can be carried out as a batch, semicontinuous, or continuous operation, it is most economically operated as part of an integrated ecological system for treating used lubricating oil. The process can best be understood in conjunction with the drawing which illustrates in schematic form a process for treating used lubricating oils together with recovery of the treated oil and recycle of the treating components as carried out in a prior art method and with the incorporation of the recovery and reprocessing system of the present invention substituted in the prior art system.

Referring now to the drawing and illustrating specific operating ranges in a typical system, used oil can be passed through line 1 to a preheater 3 where the temperature is raised to a range from about 200° F. (93° C.) to about 500° F. (260° C.). The preheated oil is passed through line 5 into the first of a series of stirred reactor 7 where it is contacted with an aqueous solution of ammonium sulfate and/or ammonium bisulfate which has been preheated to a temperature in the same range. The reaction mixture is agitated vigorously in reactor 7 and in reactor 11 to which it is passed through line 9. The reaction mixture is then passed through line 13 into a phase separator 15 in which an oil layer 17 and a water layer 19 are allowed to separate. Pressure in the reactors and in the oil-water separator is sufficient to maintain the reaction mixture substantially completely in the liquid phase. During the separation in the phase separator precipitated metal salts rapidly settle into the layered aqueous treating solution. The oil layer is passed through line 21 for use directly as an oil product or to be further treated.

In the prior art system the aqueous layer with precipitate is passed through line 23 into a filter 25 where the precipitate is removed through line 27 and discarded or processed to recover the metal or metals contained therein. The filtered aqueous treating solution is then passed through line 29 to zone 31 where it is admixed with ammonium sulfate and/or bisulfate from line 33 to bring the concentration of ammonium sulfate-bisulfate into the range of about 5 about 15 weight percent with recycle through line 35 into preheater 37 where the temperature is raised within the reaction temperature range and the treating material is passed through line 39 into the reactor 7.

In the present process the water layer 19 containing solids can be passed through line 23 into a means for removing precipitate 41 with a precipitate or solids being discarded through line 43 similarly to the prior art with the means for removing the solids being chosen from among such well known systems as filtration, centrifugation, and settling. In the present process, however, removal of solids at this point in the operation is optional and the water layer with or without solids removed can be passed directly through line 45 to neutralization zone 47.

The aqueous layer from the separation is neutralized by the addition of ammonium hydroxide or ammonia through line 51 to adjust the pH of the solution to about 5.0 to about 7.0, preferably to the range of about 5.5 to about 6.0.

The neutralized solution is passed through line 53 to a cooling means in which the temperature is lowered to at least about 120° F. (49° C.), preferably about 100° F. (38° C.). The operation in cooling zone 55 causes further precipitation of metallic contaminant, particularly the metal contaminant which has been found to be troublesome in the system of the prior art.

The cooled solution with precipitate is passed through line 57 to a means for removing the precipitate 59 with the precipitate being taken from the system by line 61. Here again, the means for removing the precipitate can be chosen from among well known means of centrifugation, filtration, settling, or others.

The solution with solids removed is then passed through line 62 to a zone or zones for acidification and adjustment of the concentration of ammonium and sulfate ion. In the acidification zone 63 sufficient sulfuric acid is added through line 65 to bring the pH of the solution into the range of about 0.4 to about 1.3 preferably 0.9 to about 1.1. In the concentration adjustment zone 67 reagents and water are added through line 69 to adjust the ammonium and sulfate ion content within the desired range. The preferred reagents are $NH_4OH$ and $H_2SO_4$ because of their ready availability and low cost. $NH_4HSO_4$ and $(NH_4)_2SO_4$ may also be used if desired. Water is added as needed to maintain the desired concentration. It will be seen with the examples that the addition of about 15 percent by weight water to the solution is helpful in maintaining the desired concentrations.

The treated solution is then passed through line 35 to preheater 37 and line 39 to the reactor with a continuation of the recycle. It can be seen that the method of this invention entails processes numbered from 41 through 69 which are substituted for processes 25 through 33 in the prior art. This substitution enhances the operation of the overall process for removing ash content from used lubricating oils and allows the operation of a continuous process.

In general, it should be stated that the most critical step in the present method is the neutralization of the separated water layer with cooling for precipitation of the metal contaminants from the circulating solution. This allows the removal of the precipitated solids, with the removal of the metal being the heart of the invention. The acidification and concentration adjustment then permit an optimum reactive solution to be circulated to the process for reclaiming used motor oils.

In each of the steps of this process which requires mixing, any of the various means for agitation can be used to facilitate the process. At the step of cooling the neutralized solution, retention of the cooled solution for a time sufficient to allow complete precipitation is also desirable.

In the following examples the process of the invention and the desirable improvement achieved will be illustrated.

EXAMPLE I

Treated oil was separated from the treating solution to obtain the treating solution analyzed as sample 1 which was acidified with sulfuric acid to give the analysis of sample 2 which was used as a feed of a treating process which resulted in the filtered separator bottoms analyzed as sample 3. These filtered separator bottoms were then treated with ammonium hydroxide to produce a pH of 5.5 as shown in sample 4 and the ammonium hydroxide treated solution of 4 was further adjusted in pH as shown in samples 5 and 6. The results in this table show the decrease in concentration of a specific metal, zinc, following the ammonium hydroxide treatment with no further change with additional pH adjustment. The results also show the change in $NH_4^+$ and $SO_4^=$ concentration necessary for the pH adjustments.

TABLE I

| Sample | pH | Treating Solution | | |
|---|---|---|---|---|
| | | $NH_4^+$ Wt. % | $SO_4^=$ Wt. % | Zn Wt. % |
| 1 | 1.6 | 3.83 | 13.48 | — |
| 2(a) | 1.5 | 3.81 | 14.15 | — |
| 3(b) | 1.6 | 3.64 | 12.35 | 0.24 |
| 4(c) | 5.5 | 4.73 | 11.74 | 0.01 |
| 5(d) | 9.1 | 5.22 | 11.04 | 0.01 |
| 6(e) | 1.0 | 5.03 | 17.59 | 0.01 |

(a) Used 10% $(NH_4)HSO_4$, 10% $(NH_4)_2SO_4$ solution with addition of $H_2SO_4$ used as feed for Run 3.
(b) Filtered separator bottoms
(c) Added $NH_4OH$ to pH 5.5 to solution of Run 3
(d) Filtrate from filtering of solution of Run 4 + $NH_4OH$ to pH 9.0
(e) Filtrate from filtering of solution of Run 5 + $H_2SO_4$ to pH 1.0

EXAMPLE II

In Table 2 below sample 7b shows the analysis of pertinent data for a fresh treating solution used in a run for treating used oil. The water layer from the oil treatment was collected and filtered and in each of the samples marked a below the analysis of this solution is reported. The solution of a is then treated according to various aspects of this invention and the analysis of the treated solution is reported as sample b. The solution of the b sample was then used as the feed for the next treatment of used oil to produce the next higher numerical a sample.

The samples marked 8b and 9b were obtained by treating samples 8a and 9a respectively by the addition of ammonium hydroxide to obtain a pH of 5.7, filtering the precipitate, and then adding sulfuric acid to obtain a pH of 1.1. The sample marked 10b was obtained from the sample marked 10a using the same treatment and also had the addition of 10 weight percent water after the adjustment of the pH to 1.1. The samples marked 11b and 12b were obtained from samples 11a and 12a respectively by adding ammonium hydroxide to obtain a pH of 5.5, filtering, and adding sulfuric acid to obtain a pH of 1.0.

TABLE II

| Sample | Treated Oil Sulfated Ash, Wt. %* | Treating Solution pH | $NH_4^+$ Wt. % | $SO_4^=$ Wt. % | Zn Wt. % |
|---|---|---|---|---|---|
| 7b |  | 0.8 | 4.17 | 15.84 |  |
| 8a | 0.18 | 1.1 | 3.98 | 13.21 | 0.25 |
| 8b |  | 0.7 | 4.68 | 16.23 | 0.01 |
| 9a | 0.13 | 1.0 | 4.38 | 14.63 | 0.4 |
| 9b |  | 0.7 | 5.36 | 18.50 | 0.01 |
| 10a | 0.10 | 1.0 | 4.95 | 15.84 | 0.01 |
| 10b |  | 0.6 | 5.21 | 19.65 | 0.02 |
| 11a | 0.10 | 0.8 | 4.90 | 16.44 | 0.1 |
| 11b |  | 0.4 | 5.69 | 22.47 | 0.01 |
| 12a | 0.19 | 0.7 | 5.28 | 17.98 | 0.07 |
| 12b |  | 0.2 | 6.36 | 24.98 | 0.01 |

*ASTM D 847-2

The set of data above shows a treatment using ammonium hydroxide to adjust the pH of the separator bottoms to 5.5–6.0, filtering, and adding sulfuric acid to return the solution to a pH of approximately 1.0. These data show good control of the sulfated ash, but the $SO_4^=$ ion concentration was increasing throughout the test. To control this ion buildup a series of tests were run with water addition to dilute the $NH_4^+$ and $SO_4^=$ ion buildup as shown in Example III below.

EXAMPLE III

To obtain the data in Table III below the following procedure was used: A fresh treating solution, sample 13b, containing 16 weight percent $(NH_4)_2SO_4$ was treated with sulfuric acid to obtain a pH of about 1.0. This prepared solution was used to treat a first batch of used oil. After removal of the botton phase (water solution+solids) from the separator, the phase was cooled to room temperature, ammonium hydroxide (20 percent solution) was added to the bottom phase to obtain a pH of 5.5–6.0, the solution was filtered, 15 percent by weight water was added to the filtered solution, and sulfuric acid (95 percent) was then added to the solution to obtain a pH of about 1.0. This prepared soltuion was used to treat the next batch. Thereafter, each bottom phase removed from the separator was treated in the same manner to obtain the prepared solution used to treat the next batch.

TABLE III

| Sample | Treated Oil Sulfated Ash, Wt. % | Treating Solution pH | $NH_4^+$ Wt. % | $SO_4^=$ Wt. % | Zn Wt. % |
|---|---|---|---|---|---|
| 13b |  | 0.8 | 4.17 | 15.84 |  |
| 14a | 0.10 | 1.4 | 3.90 | 12.71 | 0.20 |
| 14b |  | 0.7 | 3.96 | 16.96 | 0.01 |
| 15a | 0.10 | 1.0 | 3.79 | 13.16 | 0.26 |
| 15b |  | 0.6 | 4.02 | 16.03 | 0.03 |
| 16a | 0.09 | 0.9 | 3.82 | 13.69 | 0.21 |
| 16b |  | 0.8 | 4.39 | 20.54 | 0.01 |
| 17a | 0.09 | 1.0 | 4.07 | 13.52 | 0.17 |
| 17b |  | 0.6 | 4.44 | 16.67 | 0.01 |
| 18a | 0.14 | 0.9 | 4.20 | 13.89 | 0.15 |
| 18b |  | 0.6 | 4.48 | 16.20 | 0.01 |

The data above shows that the sulfated ash was held under control and the $NH_4^+$ and $SO_4^=$ ion concentration in the final solution was about the same as in the fresh solution. These samples illustrate that the zinc contaminant can be removed from the treating solution and the treating solution recycled for further treatment of used oil.

I claim:

1. A method for regenerating an aqueous ammonium sulfate-bisulfate treating solution containing metal and other contaminants which form ash, said method comprising:
    (a) adjusting the pH of said solution to the range that produces a precipitate of said contaminant by addition of $NH_3$ or $NH_4OH$;
    (b) cooling the pH adjusted solution to a temperature that substantially completes the precipitation;
    (c) removing the precipitate from the solution;
    (d) adjusting the pH of the solution after precipitate removal to the range of the treating solution before initial circulation by addition of $H_2SO_4$; and
    (e) adjusting the $SO_4^=$ ion concentration of the solution and the $NH_4^+$ ion concentration to the range of the treating solution before initial circulation.

2. A method of claim 1 wherein precipitate in said solution to be treated is removed prior to step (a).

3. A method of claim 1 wherein precipitate is removed by settling, filtration, or centrifugation.

4. A method of claim 2 wherein precipitate is removed by settling, filtration, or centrifugation.

5. A method of claim 1 wherein the temperature in step )b) is reduced to at least 100° F. (38° C.).

6. A method of claim 1 wherein the pH in step (d) is adjusted to the range of about 0.4 to about 1.3.

7. A method of claim 1 wherein the solution of step (e) is
    (f) heated to a temperature sufficient for reaction with used oil, and
    (g) contacted with used oil in a reactor.

8. A method for regenerating an aqueous ammonium sulfate-bisulfate treating solution containing metal and other contaminants which form ash, said method comprising:
    (a) removing contained precipitate from said solution;
    (b) adjusting the pH of said solution to the range that produces a precipitate by addition of $NH_3$ or $NH_4OH$;
    (c) cooling the pH adjusted solution to a temperature that substantially completes precipitation;
    (d) removing the precipitate from the solution;
    (e) adjusting the pH of the solution after precipitate removal to the range of the treating solution before initial circulation by addition of $H_2SO_4$;
    (f) adjusting the $SO_4^=$ ion concentration of the solution and the $NH_4^+$ ion concentration to the range of the treating solution before initial circulation.

9. A method for reducing ash content of used lubricating oil comprising:
    (a) contacting used lubricating oil with an aqueous solution of ammonium sulfate and/or ammonium bisulfate under conditions of temperature and pressure sufficient to react said ammonium sulfate and/or ammonium bisulfate with metal-containing components present in the used lubricating oil and form metal-containing solids;
    (b) allowing the reaction mass of (a) to separate into an oil phase and an aqueous phase containing said solids;
    (c) removing said oil phase;
    (d) recovering said aqueous phase;

(e) treating said aqueous phase according to claim 1; and
(f) recycling treated aqueous phase to step (a).

10. A method for reducing ash content of used lubricating oil comprising:
(a) contacting used lubricating oil with an aqueous solution of ammonium sulfate and/or ammonium bisulfate under conditions of temperature and pressure sufficient to react said ammonium sulfate and/or ammonium bisulfate with metal-containing components present in the used lubricating oil and form metal-containing solids;
(b) allowing the reaction mass of (a) to separate into an oil phase and an aqueous phase containing said solids;
(c) removing said oil phase;
(d) recovering said aqueous phase;
(e) treating said aqueous phase according to claim 8; and
(f) recycling treated aqueous phase to step (a).

* * * * *